(12) United States Patent
Yilmaz

(10) Patent No.: US 11,206,721 B1
(45) Date of Patent: Dec. 21, 2021

(54) LIGHT EMITTING DIODE PERSISTENCE EFFECT MINIMIZATION

(71) Applicant: Veoneer US, Inc., Southfield, MI (US)

(72) Inventor: Mehmet-Fatih Yilmaz, Plymouth, MI (US)

(73) Assignee: VEONEER US, INC., Southfield, MI (US)

( * ) Notice: Subject to any disclaimer, the term of this patent is extended or adjusted under 35 U.S.C. 154(b) by 0 days.

(21) Appl. No.: 16/919,200

(22) Filed: Jul. 2, 2020

(51) Int. Cl.
*H05B 45/30* (2020.01)
*H04N 5/225* (2006.01)

(52) U.S. Cl.
CPC .......... *H05B 45/30* (2020.01); *H04N 5/2256* (2013.01)

(58) Field of Classification Search
CPC .................................................... H04N 5/2256
See application file for complete search history.

(56) References Cited

U.S. PATENT DOCUMENTS

| 6,693,387 | B2* | 2/2004 | Wood | H05B 33/08 |
| | | | | 315/169.3 |
| 2002/0136033 | A1* | 9/2002 | Hirokawa | H02M 3/28 |
| | | | | 363/21.01 |
| 2013/0010134 | A1* | 1/2013 | Motoki | G03B 15/05 |
| | | | | 348/207.99 |
| 2013/0147397 | A1* | 6/2013 | McBryde | H05B 45/30 |
| | | | | 315/312 |
| 2017/0040770 | A1* | 2/2017 | Gyoten | H01S 5/4025 |
| 2017/0269146 | A1* | 9/2017 | Regau | H05B 45/52 |
| 2017/0325313 | A1* | 11/2017 | Regau | H05B 45/52 |
| 2018/0069483 | A1* | 3/2018 | Akiyama | H02M 7/06 |
| 2018/0208017 | A1 | 7/2018 | Hernandez et al. | |
| 2018/0269651 | A1 | 9/2018 | Oka et al. | |
| 2018/0319407 | A1 | 11/2018 | Lisseman et al. | |
| 2019/0290148 | A1* | 9/2019 | Kang | A61B 5/0075 |
| 2020/0359483 | A1* | 11/2020 | Saito | H05B 45/46 |

FOREIGN PATENT DOCUMENTS

DE 102013223880 A1 5/2015

OTHER PUBLICATIONS

International Search Report and Written Opinion for International Application No. PCT/US2021/036791 dated Oct. 8, 2021.

* cited by examiner

*Primary Examiner* — Abdelaaziz Tissire
*Assistant Examiner* — John H Morehead, III

(57) ABSTRACT

A system includes: a light emitting diode (LED); a switching circuit configured to: when in a first state, connect the anode of the LED to a positive potential and connect the cathode of the LED to a ground potential, thereby enabling current flow in a first direction through the LED; and when in a second state, one of: connect the ground potential to the anode of the LED; connect a negative potential to the anode of the LED; and connect the cathode of the LED to the positive potential and connect the anode of the LED to the ground potential, thereby enabling current flow in a second direction through the LED, where the second direction is opposite the first direction; and a driver module configured to selectively transition the switching circuit from the first state to the second state and from the second state to the first state.

20 Claims, 5 Drawing Sheets

LIGHT EMITTING DIODE PERSISTENCE EFFECT MINIMIZATION

FIELD

The present disclosure relates to light emitting diodes (LEDs) and more particularly to systems and methods for reducing the persistence effect of LEDs.

BACKGROUND

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to light emitting diodes (LEDs) and more particularly to systems and methods for reducing the persistence effect of LEDs.

A light emitting diode (LED) is a semiconductor based light source. The LED emits light when current flows through the LED. Electrons in the semiconductor recombine with electron holes to release energy in the form of photons. The color of the light emitted by the LED corresponds to the energy of the photons.

LEDs are used in various different industries. For example, some LEDs emit low intensity infrared (IR) light and are used in remote control circuits, such as to control televisions. As another example, LEDs may be used as visual indicators and replace light bulbs. LEDs may also be used as other light sources, such as in residential and commercial lighting. As yet another example, LEDs may be used in seven-segment displays and other types of displays. LEDs have advantages over incandescent light sources (e.g., bulbs), such as lower energy consumption, lower heat generation, longer life, etc.

SUMMARY

In a feature, a system includes: a light emitting diode (LED) having an anode and a cathode; a switching circuit configured to: when in a first state, connect the anode of the LED to a positive reference potential and connect the cathode of the LED to a ground reference potential, thereby enabling current flow in a first direction through the LED; and when in a second state, one of: connect the ground reference potential to the anode of the LED; connect a negative reference potential to the anode of the LED; and connect the cathode of the LED to the positive reference potential and connect the anode of the LED to the ground reference potential, thereby enabling current flow in a second direction through the LED, where the second direction is opposite the first direction; and a driver module configured to selectively transition the switching circuit from the first state to the second state and from the second state to the first state.

In further features, when in the second state, the switching circuit is configured to connect the ground reference potential to the anode of the LED.

In further features: the switching circuit includes: a first switch having a first terminal connected to the positive reference potential and a second terminal connected to a first node; a second switch having a first terminal connected to the first node and a second terminal connected to a second node; the anode of the LED is connected to the first node; the cathode of the LED is connected to the second node; and the ground reference potential is connected to the second node.

In further features, the driver module is configured to: close the first switch and open the second switch to operate the switching circuit in the first state; and open the first switch and close the second switch to operate the switching circuit in the second state.

In further features, when in the second state, the switching circuit is configured to connect the negative reference potential to the anode of the LED.

In further features: the switching circuit includes: a first switch having a first terminal connected to the positive reference potential and a second terminal connected to a first node; a second switch having a first terminal connected to the negative reference potential and a second terminal connected to the first node; and a second node connected to the cathode of the LED; and the anode of the LED is connected to the first node.

In further features, the driver module is configured to: operate the switching circuit in the first state by closing the first switch and opening the second switch; and operate the switching circuit in the second state by opening the first switch and closing the second switch.

In further features, the driver module is configured to: maintain the first switch open and the second switch closed for a predetermined persistence period; and open the second switch once the predetermined persistence period has elapsed.

In further features, when in the second state, the switching circuit is configured to connect the cathode of the LED to the positive reference potential and connect the anode of the LED to the ground reference potential, thereby enabling current flow in the second direction through the LED.

In further features, the switching circuit includes: a first switch having a first terminal connected to the positive reference potential and a second terminal connected to a first node; a second switch having a first terminal connected to the positive reference potential and a second terminal connected to a second node; a third switch having a first terminal connected to the first node and a second terminal connected to the ground reference potential; and a fourth switch having a first terminal connected to the second node and a second terminal connected to the ground reference potential; the anode of the LED is connected to the first node; and the cathode of the LED is connected to the second node.

In further features, the driver module is configured to: operate the switching circuit in the first state by closing the first switch and fourth switches and opening the second switch and third switches; and operate the switching circuit in the second state by opening the first and fourth switches and closing the second and third switches.

In further features, the driver module is configured to: maintain the first and fourth switches open and the second and third switches closed for a predetermined persistence period; and open the second and third switches once the predetermined persistence period has elapsed.

In further features, the driver module is further configured to close the fourth switch once the predetermined persistence period has elapsed.

In further features, the LED is configured to emit light having a wavelength of between 700 nanometers (nm) and 1 millimeter (mm).

In further features: a camera; and an imaging module configured to: actuate the camera and capture a first image using the camera while the switching circuit is in the first state; and actuate the camera and capture a second image using the camera while the switching circuit is in the second state.

In further features, the imaging module is configured to actuate the camera and capture images at a predetermined frequency, where the predetermined frequency is at least 10 Hz.

In further features, the driver module is configured to transition the switching circuit from the second state to the first state at the predetermined frequency.

In further features, the imaging module is configured to adjust the first image using the second image.

In further features, the camera is an infrared (IR) camera and is configured to capture images within a passenger cabin of a vehicle.

In a feature a method includes: selectively operating a switching circuit in a first state, thereby: connecting an anode of a light emitting diode (LED) to a positive reference potential; connecting a cathode of the LED to a ground reference potential; and enabling current flow in a first direction through the LED; and selectively operating a switching circuit in a second state, thereby one of: connecting the ground reference potential to the anode of the LED; connecting a negative reference potential to the anode of the LED; and connecting the cathode of the LED to the positive reference potential, connecting the anode of the LED to the ground reference potential, and enabling current flow in a second direction through the LED, where the second direction is opposite the first direction; and selectively transitioning the switching circuit from the first state to the second state and from the second state to the first state.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Light emitting diodes (LEDs) may be used for illumination, such as illumination within a passenger cabin of a vehicle. An LED may be turned on when a camera is used such that an environment in an image captured using the camera is illuminated by the LED. This sort of image may be referred to as a content image. Background images may also be captured with the LED off. Characteristics of the background images (e.g., background illumination) may be used to adjust characteristics of the content images.

The LED emits light for a period of time after current through the LED is disabled. This phenomenon may be referred to as the persistence of the LED. The persistence of the LED may affect one or more characteristics of the background images. The background images (taken during persistence) may affect the adjustment of the content images.

The present application involves minimizing persistence of the LED. For example, a driver module of an LED may shunt an anode of the LED to ground to minimize the persistence (period) of the LED. As another example, the driver module may apply a negative reference potential to the anode of the LED or apply power to the LED in reverse of normal orientation to minimize the persistence (period) of the LED. This may improve the background images.

Figure 1:
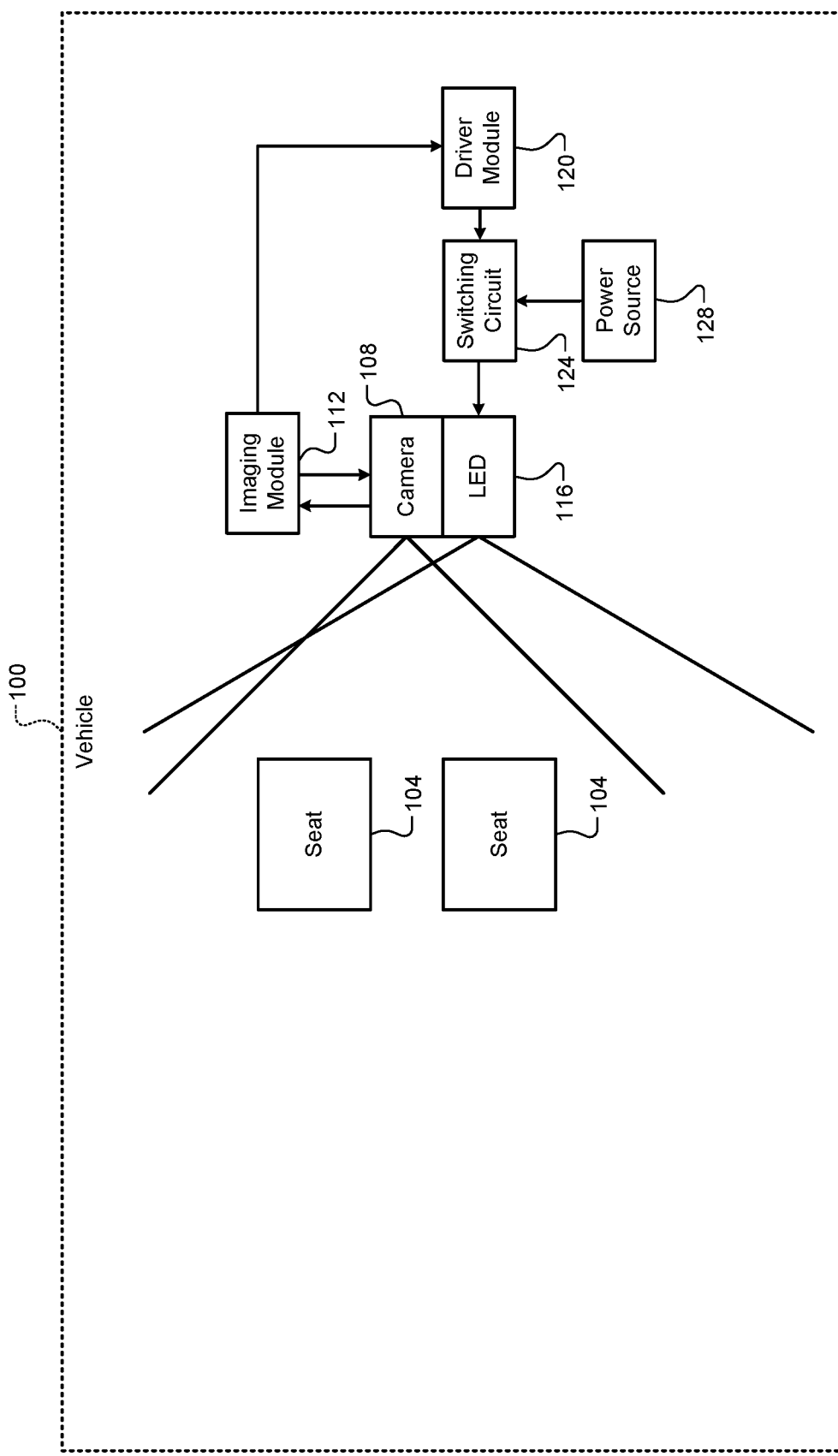
FIG. 1 is a functional block diagram of an example vehicle system.

FIG. 1 includes a functional block diagram of an example vehicle 100. While the example of a vehicle is provided, the present application is also applicable to non-vehicle implementations including LEDs (e.g., machine vision, optical inspection, lighting) and other uses of LEDs in vehicles.

The vehicle 100 includes a passenger cabin that includes one or more seats, such as seats 104. Vehicle occupants may sit on seats within the passenger cabin while the vehicle moves. The vehicle 100 may be an autonomous vehicle (that drives without user input), a semiautonomous vehicle (that drives without user input under some circumstances and based on user input under other circumstances), or a non-autonomous vehicle (that is driven by a user). While the example of two seats is provided, the vehicle 100 may include more than two seats or only one seat. A seatbelt is provided with each seat.

A camera 108 is configured and arranged to capture images within the passenger cabin. The camera 108 may be, for example, an infrared (IR) camera or another suitable type of camera.

An imaging module 112 triggers the camera 108 to capture images at a predetermined frequency, such as 20-110 Hertz (Hz) or another suitable frequency. As such, the camera 108 captures one image every predetermined period, where the predetermined period corresponds to 1 divided by the predetermined frequency. The images alternate back and forth between content images and background images. In other words, one image captured by the camera 108 is a content image, a next image captured by the camera 108 is a background image, a next image captured by the camera 108 is a content image, a next image captured by the camera 108 is a background image, and so on.

A light emitting diode (LED) 116 is on while the camera 108 captures content images. The LED 116 is off while the camera 108 captures background images. While the example of the single LED 116 is provided and will be discussed for simplicity, the LED 116 may include more than one LEDs connected in series, parallel, or a combination of series and parallel. The LED 116 may be, for example, an IR LED (that emits light in the IR range between 700 nanometers and 1 millimeter) or another suitable type of LED.

A driver module 120 controls turning on and turning off of the LED 116 by controlling switches of a switching circuit 124 to control application of power to the LED 116 from one or more power sources, such as power source 128. The power source 128 may include a direct current (DC) voltage. The power source 128 may include or be generated based on a battery, such as a 12 volt vehicle battery or another suitable type of battery. In various implementations, the power source may include a voltage converter that converts voltage from another power source (e.g., a vehicle battery) into a voltage suitable for application to the LED 116. The driver module 120 turns the LED 116 on for content images and turns the LED 116 off for background images. The driver module 120 therefore turns the LED 116 on and off at a predetermined LED frequency, such as corresponding to 10-55 times per second.

The imaging module 112 may perform one or more image processing functions based on the images captured by the camera 108. For example, the imaging module 112 may remove background illumination from a content image using the background image taken next after that content image was captured. The imaging module 112 may perform one or more functions based on the resulting content image. For example, the imaging module 112 may determine whether an occupant is seated on a seat based on the resulting content image.

The LED 116, however, naturally emits light for some amount of time after power is removed from the LED 116. In other words, the LED 116 does not turn off (and stop emitting light) immediately when current flow through the LED 116 is stopped. This may be referred to as the persistence of the LED 116. If background images are captured while the LED 116 is still on (due to its persistence), the LED 116 may (artificially) contribute to the background lighting. This may affect the image processing functions performed by the imaging module 112, such as the removal of background illumination from content images.

According to the present application, the driver module 120 minimizes or reduces the persistence of the LED 116. For example, the driver module 120 may shunt the anode of the LED 116 to a ground reference potential after turning off power to the LED 116. Additionally or alternatively, the driver module 120 may connect the anode of the LED 116 to a negative power source after turning off power to the LED 116. Additionally or alternatively, the driver module 120 may reverse power the LED 116 (e.g., apply a positive reference potential to the cathode and a negative reference potential or ground to the anode) after turning off power to the LED 116.

Figure 2:
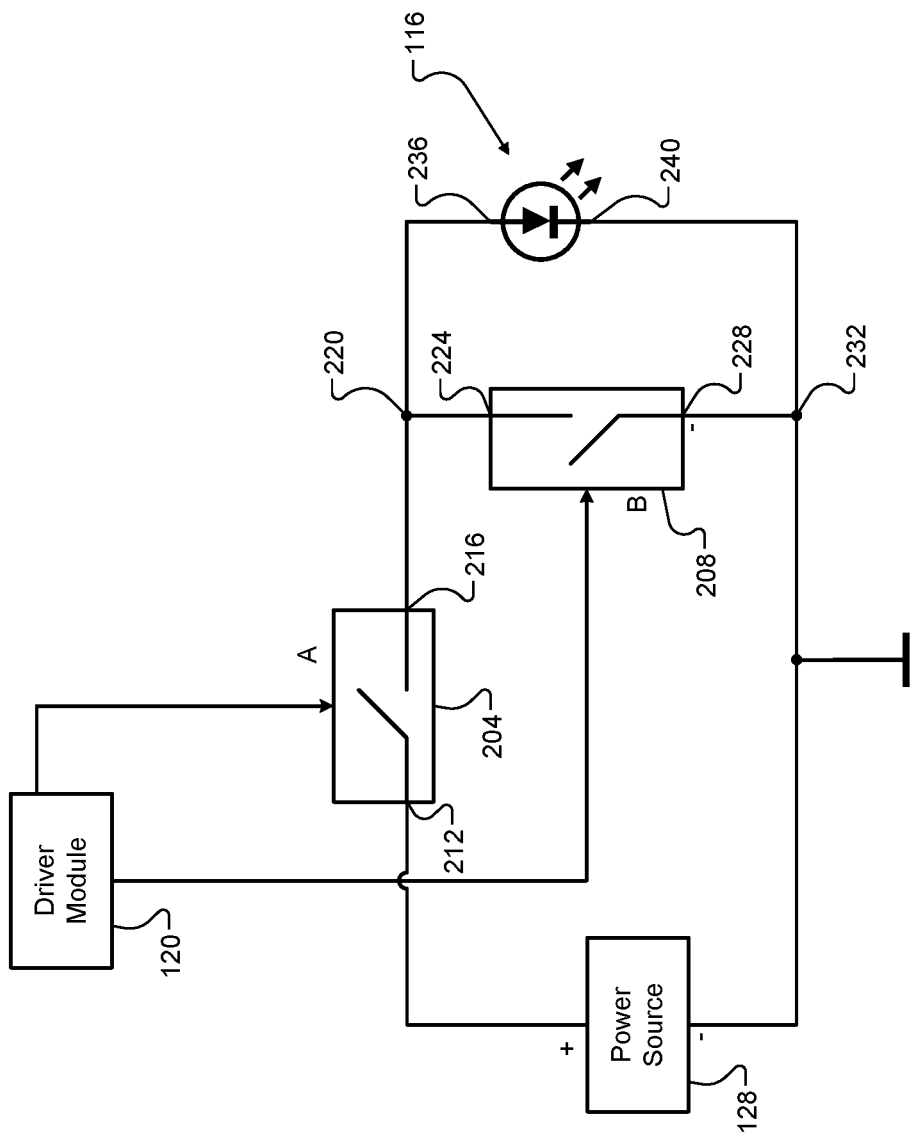
FIGS. 2-4 are schematics of example circuits for minimizing persistence of a light emitting diode.

FIG. 2 is a schematic of an example circuit for minimizing persistence of the LED 116. In the example of FIG. 2, the switching circuit 124 includes a first switch 204 (A) and a second switch 208 (B), and the driver module 120 minimizes persistence by shunting the anode of the LED 116 to ground.

A first terminal 212 of the first switch 204 is connected to a positive (+) reference potential (e.g., +12 volts DC) from the power source 128. A second terminal 216 of the first switch 204 is connected to a node 220. The first switch 204 may be, for example, a metal oxide semiconductor field effect transistor (MOSFET) or another suitable type of switch.

A first terminal 224 of the second switch 208 is connected to the node 220. A second terminal 228 of the second switch 208 is connected to a node 232. The second switch 208 may be, for example, a MOSFET or another suitable type of switch. The node 232 is connected to a ground reference potential, such as a chassis ground of the vehicle. A negative reference potential of the power source 128 may also be connected to the ground reference potential.

An anode 236 of the LED 116 is connected to the node 220. A cathode 240 of the LED 116 is connected to the node 232.

The driver module 120 controls the first and second switches 204 and 208 to control the LED 116. To turn the LED 116 on, the driver module 120 closes the first switch 204 (e.g., turns the first switch 204 on) and concurrently opens the second switch 208 (e.g., turns the second switch 208 off). To turn the LED 116 off and minimize the persistence of the LED 116, the driver module 120 closes the second switch 208 (e.g., turns the second switch 208 on) and concurrently opens the first switch 204 (e.g., turns the first switch 204 off). Below is an example table illustrative of the states of the first and second switches 204 and 208 to turn the LED 116 on and off.

|  | First Switch (A) | First Switch (B) |
| --- | --- | --- |
| LED On | ON | OFF |
| LED Off | OFF | ON |

Figure 3:
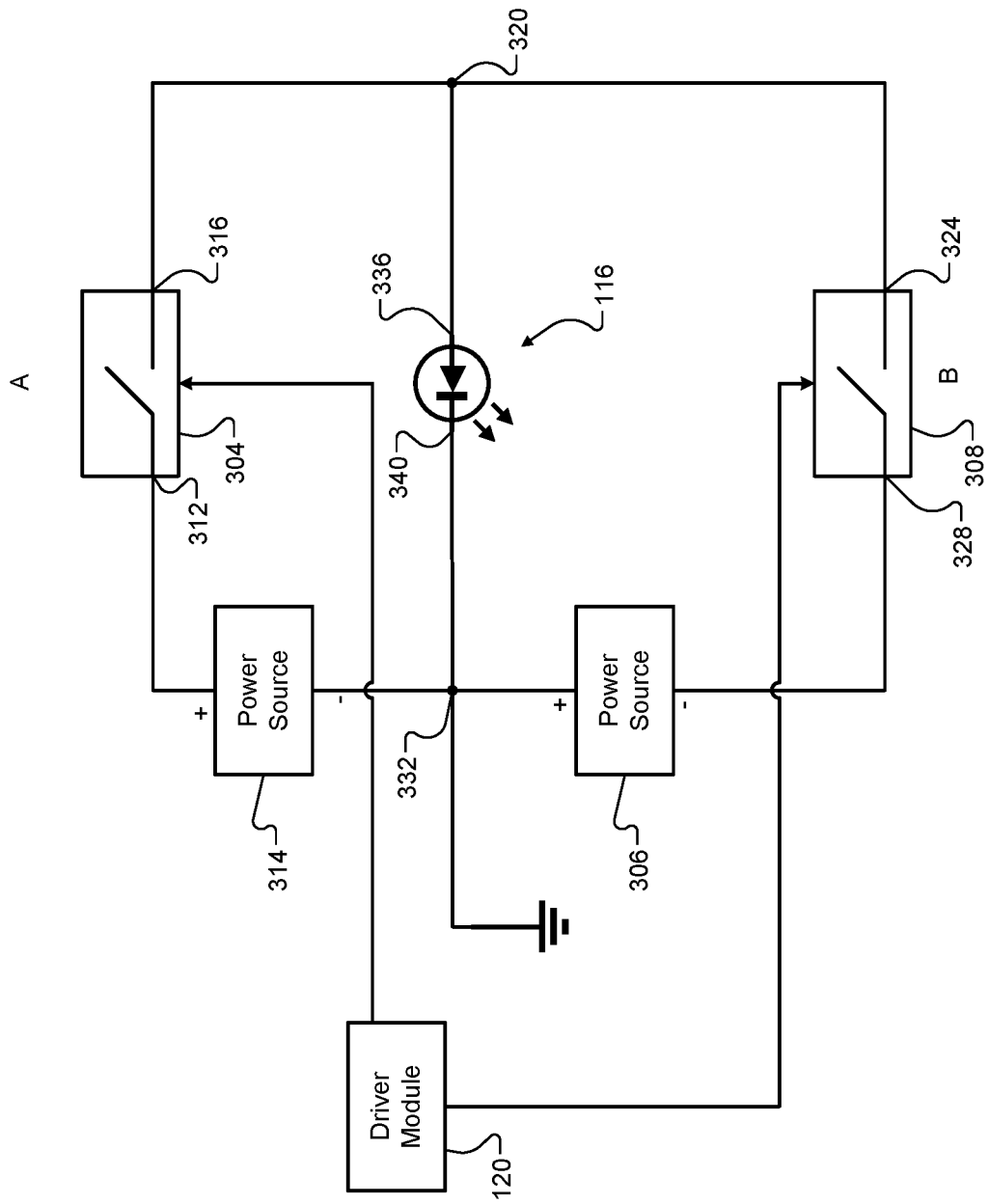

FIG. 3 is a schematic of an example circuit for minimizing persistence of the LED 116. In the example of FIG. 3, the switching circuit 124 includes a first switch 304 (A) and a second switch 308 (B), and the driver module 120 minimizes persistence by applying a negative reference potential to the LED 116.

A first terminal 312 of the first switch 204 is connected to a positive (+) reference potential (e.g., +12 volts DC) from a power source 314. A second terminal 316 of the first switch 304 is connected to a node 320. The first switch 304 may be, for example, a MOSFET or another suitable type of switch.

A first terminal 324 of the second switch 308 is connected to the node 320. A second terminal 328 of the second switch 208 is connected to a negative reference potential of a power source 306. The second switch 308 may be, for example, a MOSFET or another suitable type of switch.

A negative reference potential of the power source 314 is connected to a node 332. A positive reference potential (e.g., +12 volts DC) of the power source 306 is also connected to the node 332. The power source 128 includes the power source 306 and the power source 314 in this example.

An anode 336 of the LED 116 is connected to the node 320. A cathode 340 of the LED 116 is connected to the node 332.

The driver module 120 controls the first and second switches 304 and 308 to control the LED 116. To turn the LED 116 on, the driver module 120 closes the first switch 304 (e.g., turns the first switch 304 on) and concurrently opens the second switch 308 (e.g., turns the second switch 308 off). To turn the LED 116 off and minimize the persistence of the LED 116, the driver module 120 closes the second switch 308 (e.g., turns the second switch 308 on) and concurrently opens the first switch 304 (e.g., turns the first switch 304 off). The driver module 120 maintains the second switch 308 closed and the first switch 304 open for a predetermined persistence period. The LED 116 is completely off when the predetermined persistence period has passed. Once the predetermined persistence period has passed, the driver module 120 transitions the second switch 308 to open and maintains the first switch 304 open.

Below is an example table illustrative of the states of the first and second switches 304 and 308 to turn the LED 116 on and off.

|  | First Switch (A) | First Switch (B) |
| --- | --- | --- |
| LED On | ON | OFF |
| LED Off (for predetermined persistence period) | OFF | ON |
| LED Off (after predetermined persistence period) | OFF | OFF |

Figure 4:
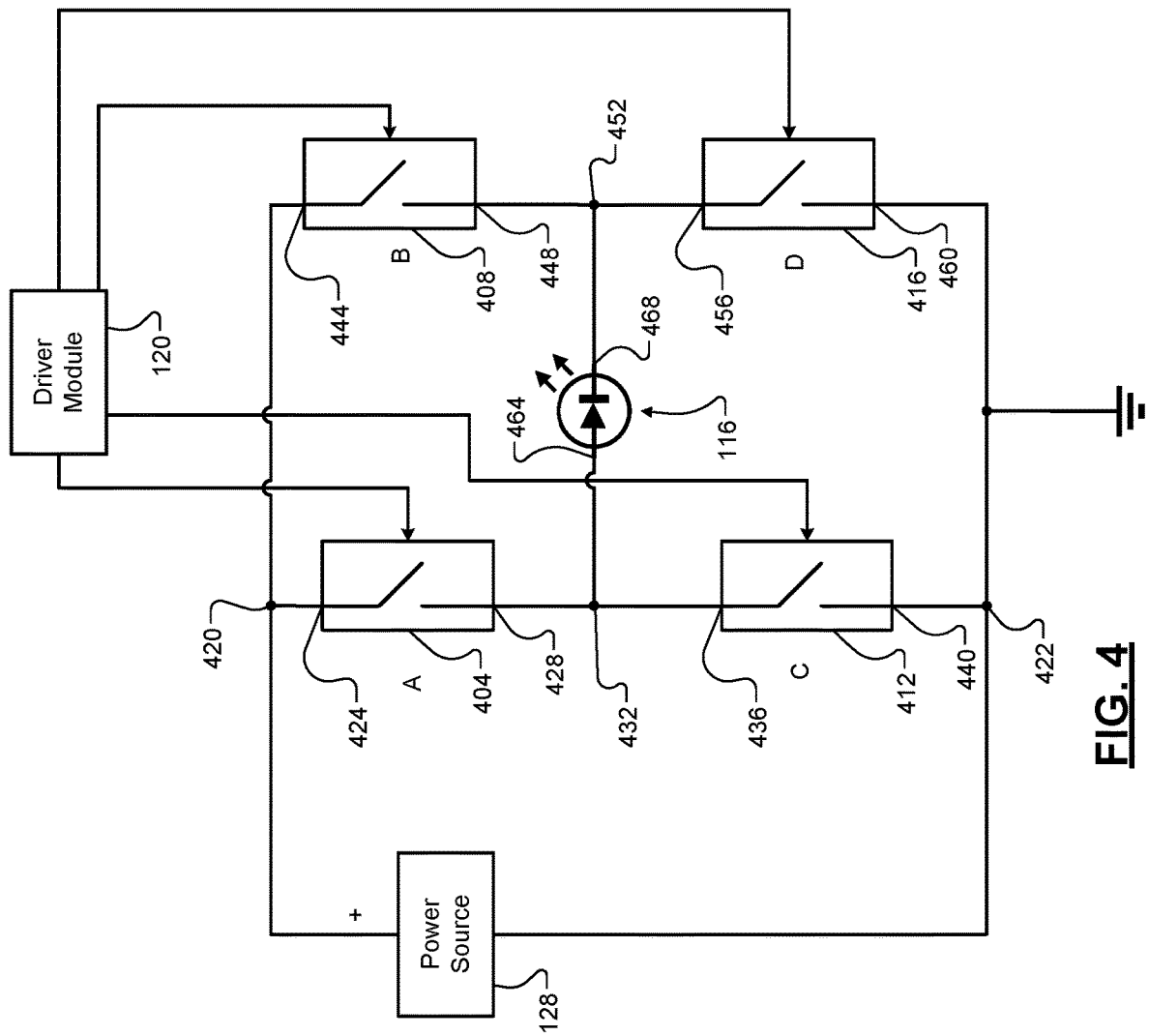

FIG. 4 is a schematic of an example circuit for minimizing persistence of the LED 116. In the example of FIG. 4, the switching circuit 124 includes a first switch 404 (A), a second switch 408 (B), a third switch 412 (C), and a fourth switch 416 (D). The driver module 120 minimizes persistence by reverse powering the LED 116 (by applying a positive reference potential to the cathode and a negative reference potential or ground to the anode).

A positive (+) reference potential (e.g., +12 volts DC) of the power source 128 is connected to a node 420. A negative (−) reference potential of the power source 128 is connected to a node 422. The node 422 is connected to a ground reference potential, such as a chassis ground of the vehicle.

A first terminal 424 of the first switch 404 is connected to the node 420. A second terminal 428 of the first switch 404 is connected to a node 432. The first switch 404 may be, for example, a MOSFET or another suitable type of switch.

A first terminal 436 of the third switch 412 is connected to the node 432. A second terminal 440 of the third switch 412 is connected to the node 422. The third switch 412 may be, for example, a MOSFET or another suitable type of switch.

A first terminal 444 of the second switch 408 is connected to the node 420. A second terminal 448 of the second switch 408 is connected to a node 452. The second switch 408 may be, for example, a MOSFET or another suitable type of switch.

A first terminal 456 of the fourth switch 416 is connected to the node 452. A second terminal 460 of the fourth switch 416 is connected to the node 422. The fourth switch 416 may be, for example, a MOSFET or another suitable type of switch.

An anode 464 of the LED 116 is connected to the node 432. A cathode 468 of the LED 116 is connected to the node 452. In this example, the first, second, third, and fourth switches 404, 408, 412, and 416 form a bridge.

The driver module 120 controls the first, second, third, and fourth switches 404, 408, 412, and 416 to control the LED 116. To turn the LED 116 on, the driver module 120 closes the first and fourth switches 404 and 416 (e.g., turns the first and fourth switches 404 and 416 on) and concurrently opens the second and third switches 408 and 412 (e.g., turns the second and third switches 408 and 412 off). To turn the LED 116 off and minimize the persistence of the LED 116, the driver module 120 closes the second and third switches 408 and 412 (e.g., turns the second and third switches 408 and 412 on) and concurrently opens the first and fourth switches 404 and 416 (e.g., turns the first and fourth switches 404 and 416 off). The driver module 120 maintains the second and third switches 408 and 412 closed and the first and fourth switches 404 and 416 open for a predetermined persistence period. The LED 116 is completely off when the predetermined persistence period has passed. Once the predetermined persistence period has passed, the driver module 120 transitions the second and third switches 408 and 412 to open and maintains the first switch 404 open. The driver module 120 may also maintain the fourth switch 416 open or transition the fourth switch 416 closed after the predetermined persistence period has passed.

Below is an example table illustrative of the states of the first, second, third, and fourth switches 404, 408, 412, and 416 to turn the LED 116 on and off.

|  | First Switch (A) | Second Switch (B) | Third Switch (C) | Fourth Switch (D) |
| --- | --- | --- | --- | --- |
| LED On | ON | OFF | OFF | ON |
| LED Off (for predetermined persistence period) | OFF | ON | ON | Off |
| LED Off (after predetermined persistence period) | OFF | OFF | OFF | ON (Or OFF) |

In the table above, for LED OFF (after the predetermined persistence period), the driver module 120 may set both the third (C) and fourth (D) switches 412 and 416 on or off. When both the first (A) and second (B) switches 404 and 408 are off, the states of the third (C) and fourth (D) switches 412 and 416 do not matter and the LED 116 will be off. Also, if the third (C) and fourth (D) switches 412 and 416 are off, the driver module 120 may control the first (A) and second (B) switches 404 and 408 to be either on or off. In other words, if top side switches are off, the LED 116 will be off regardless of the states of the bottom side switches. Conversely, if bottom side switches are off, the LED 116 will be off regardless of the states of the top side switches.

Figure 5:
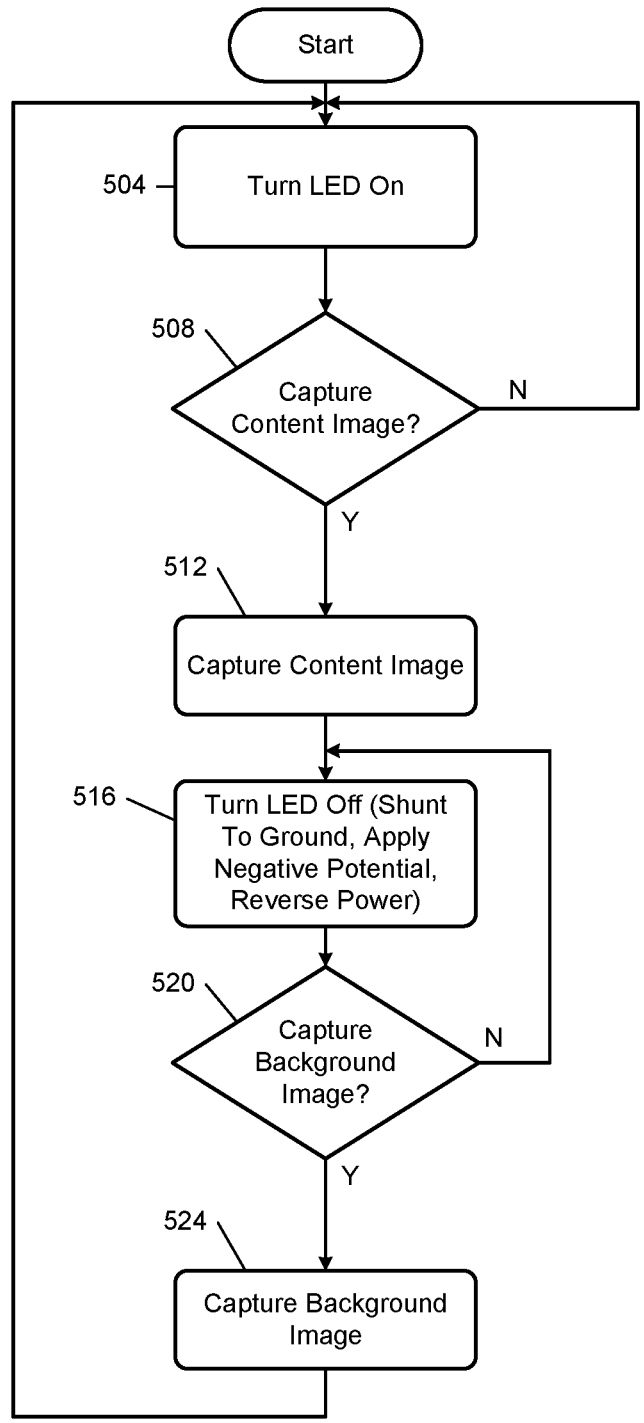
FIG. 5 is a flowchart depicting an example method of turning a light emitting diode on and off while minimizing persistence of the light emitting diode.

FIG. 5 is a flowchart depicting an example method of turning the LED 116 on and off while minimizing persistence of the LED 116. Control begins with 504 where the driver module 120 actuates the switching circuit 124 such that (positive) current flows through the LED 116 and the LED 116 is on and emits light. The imaging module 112 may prompt the driver module 120 to turn the LED 116 on for the capturing of a content image.

At 508, the imaging module 112 determines whether to capture a content image. For example, the imaging module 112 may determine whether a predetermined period has passed since a last (e.g., background) image was captured. If 508 is true, control continues with 512. If 508 is false, control returns to 504 and the driver module 120 maintains the LED 116 on.

At 512, the imaging module 112 actuates the camera 108 to capture a content image. At 516, after the content image has been captured, the driver module 120 actuates the switching circuit 124 to turn the LED 116 off and minimize the persistence of the LED 116. The imaging module 112 may prompt the driver module 120 to turn the LED 116 off for the capturing of a background image. The driver module 120 may control the switching circuit 124 as described above with respect to the examples of FIG. 2, 3, or 4.

At 520, the imaging module 112 determines whether to capture a background image. For example, the imaging module 112 may determine whether a predetermined period has passed since the last (e.g., content) image was captured (e.g., at 512). If 520 is true, control continues with 524. If 520 is false, control returns to 516 and the driver module 120 maintains the LED 116 off. At 524, the imaging module 112 actuates the camera 108 to capture a background image. The imaging module 112 may perform one or more image processing functions on the content image (e.g., captured at 512) and the background image (e.g., captured at 524). For example, the imaging module 112 may remove background illumination in the content image based on background illumination in the background image. Control may return to 504.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP:

Hypertext Preprocessor), Scala, Eiffel, Smalltalk, Erlang, Ruby, Flash®, Visual Basic®, Lua, MATLAB, SIMULINK, and Python®.

What is claimed is:
1. A system, comprising:
a light emitting diode (LED) having an anode and a cathode;
a switching circuit configured to:
when in a first state, connect the anode of the LED to a positive reference potential and connect the cathode of the LED to a ground reference potential, thereby enabling current flow in a first direction through the LED; and
when in a second state, one of:
connect the ground reference potential to the anode of the LED;
connect a negative reference potential to the anode of the LED; and
connect the cathode of the LED to the positive reference potential and connect the anode of the LED to the ground reference potential, thereby enabling current flow in a second direction through the LED,
wherein the second direction is opposite the first direction; and
a driver module configured to selectively transition the switching circuit from the first state to the second state and from the second state to the first state.
2. The system of claim 1 wherein, when in the second state, the switching circuit is configured to connect the ground reference potential to the anode of the LED.
3. The system of claim 2 wherein:
the switching circuit includes:
a first switch having a first terminal connected to the positive reference potential and a second terminal connected to a first node;
a second switch having a first terminal connected to the first node and a second terminal connected to a second node;
the anode of the LED is connected to the first node;
the cathode of the LED is connected to the second node; and
the ground reference potential is connected to the second node.
4. The system of claim 3 wherein the driver module is configured to:
close the first switch and open the second switch to operate the switching circuit in the first state; and
open the first switch and close the second switch to operate the switching circuit in the second state.
5. The system of claim 1 wherein, when in the second state, the switching circuit is configured to connect the negative reference potential to the anode of the LED.
6. The system of claim 5 wherein:
the switching circuit includes:
a first switch having a first terminal connected to the positive reference potential and a second terminal connected to a first node;
a second switch having a first terminal connected to the negative reference potential and a second terminal connected to the first node; and
a second node connected to the cathode of the LED; and
the anode of the LED is connected to the first node.
7. The system of claim 6 wherein the driver module is configured to:

operate the switching circuit in the first state by closing the first switch and opening the second switch; and
operate the switching circuit in the second state by opening the first switch and closing the second switch.
8. The system of claim 7 wherein the driver module is configured to:
maintain the first switch open and the second switch closed for a predetermined persistence period; and
open the second switch once the predetermined persistence period has elapsed.
9. The system of claim 1 wherein, when in the second state, the switching circuit is configured to connect the cathode of the LED to the positive reference potential and connect the anode of the LED to the ground reference potential, thereby enabling current flow in the second direction through the LED.
10. The system of claim 9 wherein:
the switching circuit includes:
a first switch having a first terminal connected to the positive reference potential and a second terminal connected to a first node;
a second switch having a first terminal connected to the positive reference potential and a second terminal connected to a second node;
a third switch having a first terminal connected to the first node and a second terminal connected to the ground reference potential; and
a fourth switch having a first terminal connected to the second node and a second terminal connected to the ground reference potential;
the anode of the LED is connected to the first node; and
the cathode of the LED is connected to the second node.
11. The system of claim 10 wherein the driver module is configured to:
operate the switching circuit in the first state by closing the first switch and fourth switches and opening the second switch and third switches; and
operate the switching circuit in the second state by opening the first and fourth switches and closing the second and third switches.
12. The system of claim 11 wherein the driver module is configured to:
maintain the first and fourth switches open and the second and third switches closed for a predetermined persistence period; and
open the second and third switches once the predetermined persistence period has elapsed.
13. The system of claim 12 wherein the driver module is further configured to close the fourth switch once the predetermined persistence period has elapsed.
14. The system of claim 1 wherein the LED is configured to emit light having a wavelength of between 700 nanometers (nm) and 1 millimeter (mm).
15. The system of claim 1 further comprising:
a camera; and
an imaging module configured to:
actuate the camera and capture a first image using the camera while the switching circuit is in the first state; and
actuate the camera and capture a second image using the camera while the switching circuit is in the second state.
16. The system of claim 15 wherein the imaging module is configured to actuate the camera and capture images at a predetermined frequency,
wherein the predetermined frequency is at least 10 Hz.

17. The system of claim 16 wherein the driver module is configured to transition the switching circuit from the second state to the first state at the predetermined frequency.

18. The system of claim 15 wherein the imaging module is configured to adjust the first image using the second image.

19. The system of claim 15 wherein the camera is an infrared (IR) camera and is configured to capture images within a passenger cabin of a vehicle.

20. A method, comprising:
  selectively operating a switching circuit in a first state, thereby:
    connecting an anode of a light emitting diode (LED) to a positive reference potential;
    connecting a cathode of the LED to a ground reference potential; and
    enabling current flow in a first direction through the LED; and
  selectively operating a switching circuit in a second state, thereby one of:
    connecting the ground reference potential to the anode of the LED;
    connecting a negative reference potential to the anode of the LED; and
    connecting the cathode of the LED to the positive reference potential, connecting the anode of the LED to the ground reference potential, and enabling current flow in a second direction through the LED,
    wherein the second direction is opposite the first direction; and
  selectively transitioning the switching circuit from the first state to the second state and from the second state to the first state.

* * * * *